No. 12,231. REISSUED JUNE 21, 1904.

H. F. KEIL.

BRACKET AND SUPPORT.

APPLICATION FILED MAR. 17, 1904.

Witnesses:
E. B. Bolton
G. Dunne

Inventor:
H. F. Keil.
By J. O. Fowler Jr.
his Attorney

THE NORRIS PETERS CO., PHOTO-LITHO., WASHINGTON, D. C.

No. 12,231. Reissued June 21, 1904.

UNITED STATES PATENT OFFICE.

HENRY FRANCIS KEIL, OF BRONXVILLE, NEW YORK.

BRACKET AND SUPPORT.

SPECIFICATION forming part of Reissued Letters Patent No. 12,231, dated June 21, 1904.

Original No. 742,330, dated October 27, 1903. Application for reissue filed March 17, 1904. Serial No. 198,675.

*To all whom it may concern:*

Be it known that I, HENRY FRANCIS KEIL, a citizen of the United States of America, and a resident of Bronxville, in the county of Westchester and State of New York, have invented a certain new and useful Bracket and Support, of which the following is a specification.

My invention relates to appliances designed for use in supporting articles, and in particular to a supporting device for brackets, projecting arms or plates, &c., and to a bracket used in connection therewith; and it has for its object the provision of an appliance of the kind set forth simple in construction, inexpensive to manufacture, and which operates efficiently in practical use.

To attain the desired end, this my invention consists in the construction, arrangement, and operation of parts herein set forth.

In order to enable my invention to be fully understood, I will proceed to explain the same by reference to the drawings which accompany and form a part of this specification, in which—

Figure 1:
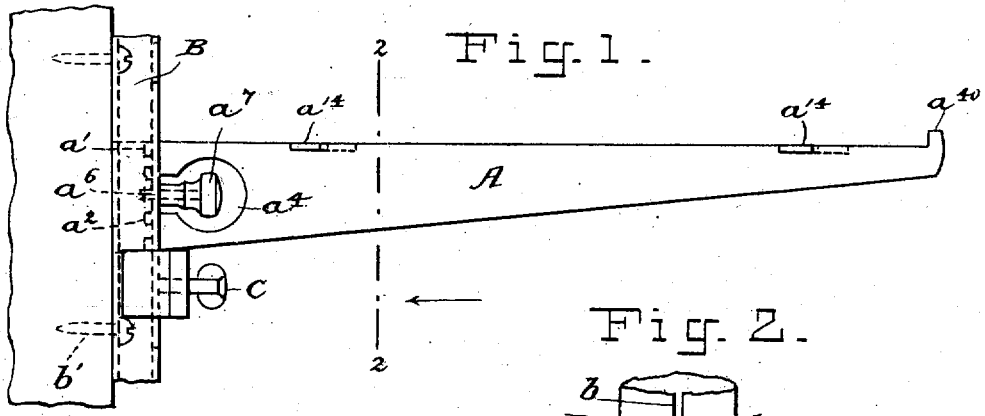
Figure 2:
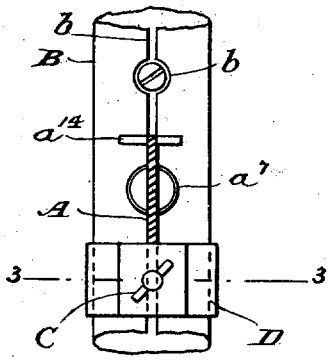
Figure 3:
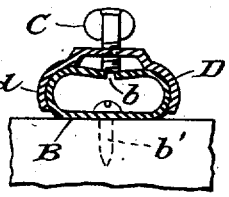
Figure 7:
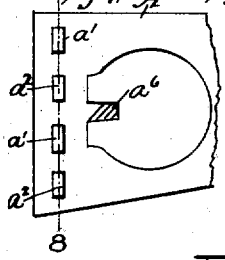
Figure 8:
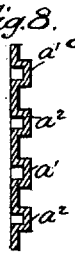
Figure 9:
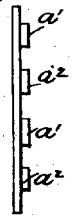
Figure 4:
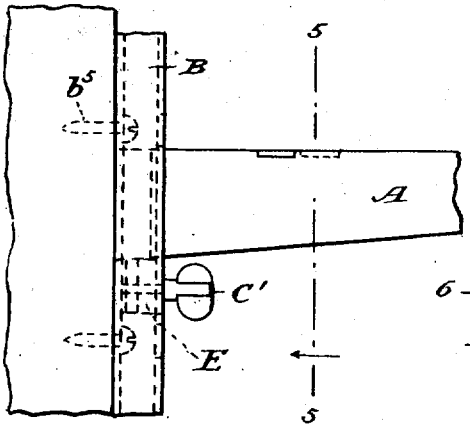
Figure 5:
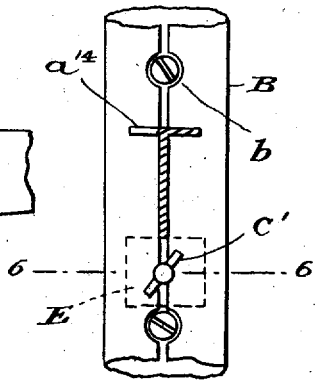
Figure 6:
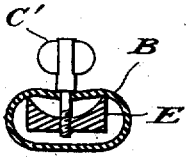

Figure 1 represents a side elevation of my support for brackets, &c., with a bracket and clamping means. Fig. 2 is a front elevation of the same viewed from line 2 2, Fig. 1. Fig. 3 is a view in section taken on the line 3 3, Fig. 2. Fig. 4 is a side elevation of one of my supports provided with another form of clamping means. Fig. 5 is a front elevation of the same; and Fig. 6 is a view in section taken on the line 6 6, Fig. 5. Fig. 7 is an elevation of the end of my bracket. Fig. 8 is a view in section taken on the line 8 8, Fig. 7; and Fig. 9 is an end view of the bracket.

Like letters of reference indicate like parts in all the views.

Referring particularly to the drawings, A denotes a bracket of any suitable form or construction and preferably provided with a pin, stud, or projection $a^{10}$, located at the outer end thereof. The bracket may be provided at the inner end thereof with a projection or, preferably, a plurality of projections $a'$ $a^2$, and the other side face of the bracket has formed in it corresponding recesses, the said lugs or faces $a'$ $a^2$ being made by stamping or pressing the side face of my bracket at the proper points to force the metal outwardly, leaving a recess rearward of the projections, as shown in the drawings. I also provide my bracket with clamping or fastening means in order to readily secure the same to the bracket-support. This may be made, as shown in Figs. 1 and 2, by stamping or cutting out a portion of the bracket, as $a^4$, and leaving a rigid stud or pin $a^6$ projecting out into the opening, which pin may be threaded, so as to support an interiorly-threaded milled thumb-nut $a^7$, the end of the shank of which may engage with and press upon the edges of the channel $b$, and thus bind the parts together. My bracket is also provided with offsetting portions or laterally-disposed lugs $a^{14}$, projecting in opposite directions from the top edge or face of my bracket to support a shelf, &c.

The bearing or support for my bracket A consists of a preferably spring-metal plate B, the sides of which are formed or bent over so as to form an interior chamber having an opening or entering-channel $b$, through which the bracket may be passed and whereby the projections $a'$ $a^2$ of the said bracket may assume a resilient engagement with the channel-jaws of the supporting device. I provide means for adjustably engaging with and pressing against the edges of the said channel $b$, as a slidable plate D, constructed and arranged to partially encircle the support B and provided with means to serve as a bearing, as the inwardly-projecting side portions $d$. The top face of the plate D is provided with a threaded perforation to engage with a preferably wing-screw C. When the bracket is held in proper position and supported by the plate D, by manipulating the screw C the end of the said screw will bear against the edges of the channel $b$ and the parts will be clamped together.

Another form of clamping device is shown in Figs. 4, 5, and 6, in which a plate E is constructed and arranged to work in the interior chamber of the support B, and it is provided with a threaded perforation in which works the preferably wing-screw C′. The said screw C′ is ordinarily provided with a shoulder to bear against the outer face of the edge portions of the support on opposite sides of the channel $b$, and by manipulating the said screw the projecting parts of the plate E (formed by the concaved face of the same) are caused to impinge the inner faces of the aforesaid edges of the support B, thereby forming a bearing for the said clamping device.

It will be observed that my support for brackets and the like is provided with an entering-channel having oppositely-disposed spring-jaws to engage with a bracket or other projecting arm, &c., formed with lateral lugs or projections, and the said support also preferably has an interior open chamber and is practically O shape in cross-section and may be used in combination with any suitable clamping means to engage with and press against the edges of the said channel.

As it is evident that many changes in the construction, form, proportion, and relative arrangement of parts might be resorted to without departing from the spirit and scope of my invention, I would have it understood that I do not restrict myself to the particular construction and arrangement of parts shown and described, but that such changes and equivalents may be substituted therefor, and that

What I claim as my invention is—

1. In a supporting device two members, one consisting of a hollow member having a wall and spring jaws or lips forming a channel and located forward of the said wall, and the other member having a plurality of laterally-disposed tongues or projections, the edge of the member extending backward of the lateral projections being constructed and arranged to lie adjacent to the inner face of the said wall, and the laterally-projecting tongues or projections being constructed and arranged to engage the inner front edge or face of the channel, whereby the second member of the supporting device may assume a resilient engagement with the channel-jaws of the first member thereof.

2. In a supporting device two members, one consisting of a hollow member having a wall and spring jaws or lips forming a channel and located forward of the said wall, and the other member having a plurality of laterally-disposed tongues or projections, the edge of the member extending backward of the lateral projections being constructed and arranged to lie adjacent to the inner face of the said wall, and the laterally-projecting tongues or projections being constructed and arranged to engage the inner front edge or face of the channel, whereby the second member of the supporting device may assume a resilient engagement with the channel-jaws of the first member thereof, in combination with means for adjusting the engagement of the said spring-jaws and the laterally-disposed projections.

3. The combination with a support provided with a channel and jaws on the opposite sides of said channel, of a bracket or arm provided with laterally-disposed means to engage said channel-jaws, and also with an orifice or open interior portion located near the bracket end, and means to clamp the support and bracket together, consisting of a screw integral with the bracket and located forward of the lateral engaging means, and a nut in engagement with said screw to work in the said opening and to bear against the exterior of said channel-jaws.

4. The combination with a support having a channel and jaws on the opposite sides of said channel, of a bracket or arm formed with a rigid end portion constructed and arranged to enter and lie adjacent to the rear wall of said support, the said bracket also having laterally-projecting tongues constructed and arranged to engage the inner front channel edge or face, and an orifice or open interior portion located near the bracket end, and a screw integral with the bracket and located forward of the lateral engaging means, and a nut in engagement with said screw to work in said opening and to bear against the exterior of said channel-jaws.

5. The combination with a resilient metal support provided with an interior open portion or chamber and a longitudinal channel, of a bracket provided with means to engage the said support, and a clamp to exert pressure outwardly at one point of the support and to force the resilient edges of said channel inwardly.

6. The combination with a resilient metal support provided with an interior open portion or chamber and a longitudinal channel, of a bracket provided with means to engage the edge of said channel, and a clamp to exert pressure outwardly at one point of the support and to force the resilient edges of said channel inwardly.

7. The combination with a resilient metal support provided with an interior open portion or chamber, and a longitudinal channel, of a bracket provided with an edge to lie adjacent to the rear wall of the support and with projecting means to engage the edge of said channel, and a clamp to exert pressure outwardly at one point of the support and to force the resilient edges of the said channel inwardly against the projecting engaging means of the bracket.

In testimony of the foregoing specification I do hereby sign the same, in the city of New York, county and State of New York, this 23d day of February, 1904.

HENRY FRANCIS KEIL.

Witnesses:

ROB. SCHWARZ,

J. ODELL FOWLER, Jr.